United States Patent [19]
Kuhn et al.

[11] Patent Number: 5,433,487
[45] Date of Patent: Jul. 18, 1995

[54] WALL PENETRATION SLEEVE

[76] Inventors: Mark A. Kuhn; Shirley A. Kuhn, both of Rte. 1 Box 141, Sterling, Kans. 67579

[21] Appl. No.: 248,483

[22] Filed: May 23, 1994

[51] Int. Cl.$^6$ .............................................. F16L 3/04
[52] U.S. Cl. ..................................... 285/158; 285/178; 285/192; 285/342; 285/346; 285/348; 285/356
[58] Field of Search ................. 285/39, 356, 369, 346, 285/158, 178, 192, 342

[56] References Cited

U.S. PATENT DOCUMENTS

| | | | |
|---|---|---|---|
| 3,006,443 | 10/1961 | Siler | 285/178 X |
| 3,430,990 | 3/1969 | Nelson | 285/346 X |
| 3,711,126 | 1/1973 | Hara et al. | 285/369 X |
| 3,776,577 | 12/1973 | Dickey | 285/356 X |
| 3,914,843 | 10/1975 | Antonacci | 285/158 X |
| 4,071,265 | 1/1978 | Wallace | 285/356 X |
| 4,174,126 | 11/1979 | Hauff | 285/356 X |
| 5,222,768 | 6/1993 | Hofer et al. | 285/39 |

OTHER PUBLICATIONS

Sigma Corporation, "Omni Sleeve" (trademark) Universal Wall Penetrations For Ductile Iron and Steel Pipe 1991.

Primary Examiner—Dave W. Arola
Attorney, Agent, or Firm—John M. Harrison

[57] ABSTRACT

A wall penetration sleeve for extending a conduit or pipe through a solid concrete, brick or other wall or connecting a first pipe provided on one side of the wall with a second pipe provided on the opposite side of the wall. The wall penetration sleeve is characterized by a cylindrical sleeve extending through the wall and internally threaded on each end to receive a corresponding pressure nut. Each pressure nut seals an o-ring or gasket in the corresponding end of the sleeve to form a moisture-tight seal between the sleeve interior and the interior of the wall such that liquid or gas cannot leak from the sleeve and accumulate in the interior of the wall as the liquid or gas flows through the pipe. An annular lock collar is either eccentrically mounted on the sleeve or includes a flat segment shaped in the collar edge to prevent the sleeve from rotating or moving transversely in the wall.

3 Claims, 1 Drawing Sheet

WALL PENETRATION SLEEVE

BACKGROUND OF THE INVENTION

1. Field of the Invention

This invention relates to devices for extending conduits through walls and more particularly, to a wall penetration sleeve for mounting in and traversing a solid concrete, brick or other wall and accommodating a pipe or conduit to allow the distribution of water, gas, electrical wiring and the like through the pipe or conduit. In a preferred embodiment of the invention the wall penetration sleeve is characterized by an elongated, cylindrical, filament-wound, fiberglass sleeve transversely mounted in a wall constructed of concrete, brick or other material. The sleeve is internally threaded on each end to receive a pair of pressure nuts which accommodate a pipe or pipes. An o-ring, or a rubber or plastic gasket provided in each end of the sleeve provides a moisture-tight seal between the sleeve and the pipe or pipes. An annular lock collar mounted circumferentially on the exterior surface of the sleeve securely mounts the sleeve in the wall and prevents fluid migration through the wall along the sleeve. The lock collar is either eccentrically mounted on the sleeve or includes a flat portion shaped in the circumference of the lock collar to prevent rotation and transverse movement of the sleeve in the wall.

Conventional methods for securing a conduit or pipe in a wall include use of conventional materials such as jute-packing, lead, rope and tar, to seal the pipe or pipes in the wall and prevent the pipe contents from leaking into the wall in case the pipe is damaged. In many cases, retrofitting of utility pipes and conduits through existing walls, including solid walls such as concrete, brick and stone, to effect a water-tight seal, is required. The wall penetration sleeve of this invention provides a simple, durable, easily installed construction for effectively receiving a utility pipe or conduit and passing virtually any material, including water and gas, as well as electrical wiring, through the pipe and wall. The use of o-rings or gaskets to seal a pipe or pipes within the sleeve interior eliminates the need for the largely inefficient conventional packing and sealing materials delineated above. Additionally, the wall penetration sleeve of this invention is designed to safely accommodate pipes which are subjected to exceedingly high pipe pressures in excess of that which may be used in conventional wall penetration devices.

REFERENCE TO DISCLOSURE DOCUMENT

The invention detailed in this application was documented in Disclosure Document No. 309040, dated May 11, 1992, a copy of which is attached to the application.

DESCRIPTION OF THE PRIOR ART

Conventionally, water, gas, electrical wiring and the like is distributed through solid walls by simply extending traditional utility pipe or conduit through the wall and sealing the pipe in the wall using tar or other materials, as noted above, or by connecting two pipes by mounting a conventional, internally-threaded steel sleeve in the wall and threading the pipes in the respective ends of the sleeve. A brochure distributed by the Sigma Corporation of Creme Ridge, N.J., details an "Omni Sleeve" (trademark) characterized by a flexible joint for transversely mounting in a solid wall and receiving a utility pipe which carries water, gas and the like through the wall. The "Omni Sleeve" allows linear rotational and deflectional realignment of the carrier pipe without the need for additional flexible couplings. A gasket mounted on the "Omni Sleeve" provides a continuous, moisture-tight seal between the sleeve and the surrounding concrete.

It is an object of this invention to provide a wall penetration sleeve for seating in a wall and extending a conduit through a wall to facilitate distributing water, gas, electrical wiring and the like through the conduit and wall.

Another object of the invention is to provide a wall penetration sleeve characterized by an elongated, cylindrical coupling or sleeve for transversely mounting in a solid, concrete, brick or other wall and receiving a single pipe or connecting a first pipe with a second pipe, to facilitate distribution of water, gas, electrical wiring and the like through the one pipe or from the first pipe, through the wall and into the second pipe in fluid-sealing relationship.

Still another object of this invention is to provide a wall penetration sleeve for mounting transversely in a wall and receiving a conduit for extension of the conduit through the wall, which sleeve is characterized by an elongated, fiberglass or plastic coupling or sleeve internally threaded in each end for threadably receiving respective pressure nuts and accommodating the conduit and further including an o-ring or gasket sealed in each end of the sleeve for sealing the conduit and thereby providing a gas and/or moisture-tight seal between the interior of the sleeve and the wall.

Yet another object of this invention is to provide a wall or ceiling penetration sleeve for mounting in a concrete, brick or other wall and receiving a length of utility pipe or conduit and facilitating distribution of a fluid or electrical wiring through the pipe and wall, which sleeve includes an elongated, generally cylindrical, filament-wound fiberglass or plastic tube transversely mounted in the wall, a pair of pressure nuts threaded into each end of the tube and an annular eccentric or truncated lock collar circumferentially mounted on the exterior surface of the tube for securing the tube in the wall and preventing fluid migration through the wall along the sleeve.

SUMMARY OF THE INVENTION

These and other objects of the invention are provided in a wall penetration sleeve characterized by an elongated, cylindrical fiberglass tube for transversely or angularly mounting in a wall or ceiling and interiorly-threaded in each end for threadably receiving respective threaded pressure nuts, which secure a utility pipe or conduit. An o-ring or gasket is seated in each end of the coupling to seal the pipe or conduit and thus provide a vapor and moisture-tight seal between the sleeve and the wall. Alternatively, a pair pipes may be extended into the wall penetration sleeve from each end and water, gas or other fluid, as well as electrical or telephone wiring or cable can be passed through the single pipe or from the first pipe into the second pipe. An annular eccentric or truncated lock collar is circumferentially mounted on the exterior surface of the sleeve to prevent rotational or longitudinal movement of the sleeve in the wall and fluid migration through the wall along the sleeve.

BRIEF DESCRIPTION OF THE DRAWINGS

The invention will be better understood by reference to the accompanying drawing, wherein.

DESCRIPTION OF THE PREFERRED EMBODIMENTS

Figure 1:
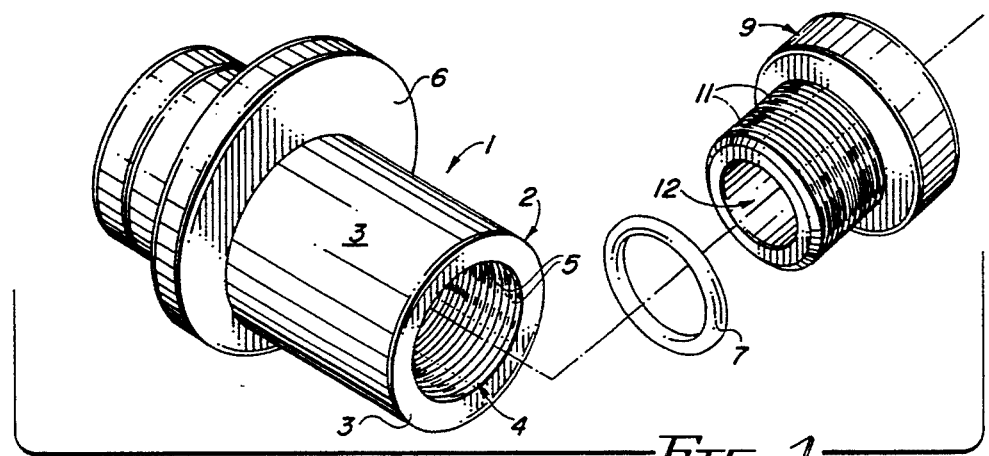
FIG. 1 is an exploded, perspective view of a preferred embodiment of the wall penetration sleeve of this invention.
Figure 2:
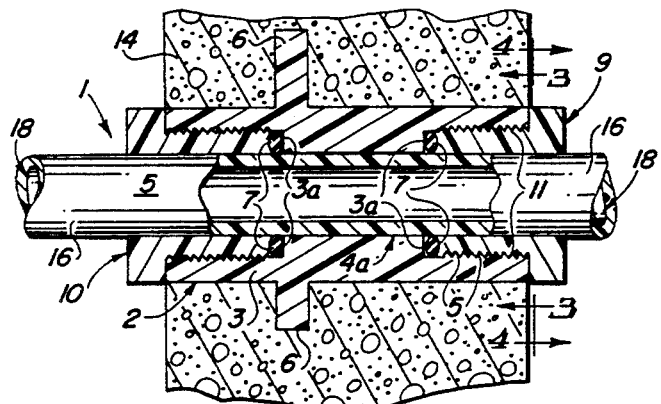
FIG. 2 is a longitudinal sectional view of the wall penetration sleeve mounted traversely in a solid concrete, brick or other similarly-constructed wall and illustrating a utility pipe extending through, and sealed within, the wall penetration sleeve.
Figure 3:
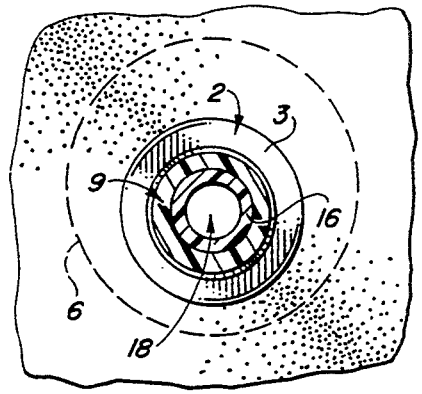
FIG. 3 is a sectional view of the wall penetration sleeve, taken along section line 3—3 in FIG. 2.
Figure 4:
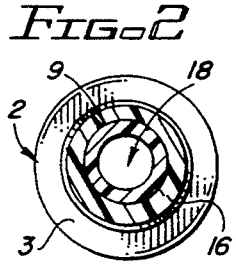
FIG. 4 is a sectional view of the wall penetration sleeve taken along section line 4—4 in FIG. 2.

Referring initially to FIGS. 1-4 of the drawing, in a first preferred embodiment the wall penetration sleeve of this invention is generally illustrated by reference numeral 1. The wall penetration sleeve 1 includes an elongated, cylindrical sleeve element 2 characterized by a continuous sleeve wall 3, typically constructed of filament-wound fiberglass or durable plastic, such as polyvinyl chloride. A sleeve bore 4 extends into each end of the sleeve element 2 and includes oppositely-disposed internal wall shoulders 3a, defining a narrowed central bore 4a, wherein the wall shoulders 3a terminate each end of the central bore 4a, as illustrated in FIG. 2. An annular lock collar 6 is circumferentially and eccentrically mounted on the exterior surface of the sleeve wall 3 and multiple, internal sleeve threads 5 are formed in the interior surfaces of the respective sleeve bores 4, in each end of the sleeve element 2. As illustrated in FIGS. 2 and 3, the sleeve element 2 is transversely mounted in a solid wall 14, constructed of concrete, brick or similar material. The lock collar 6 is encapsulated in the concrete or other material, or between adjacent bricks (not illustrated) in the case of a brick wall, as required, to securely mount the sleeve element 2 in the wall 14 and prevent fluid leak or migration through the wall 14 along the sleeve wall 3. Because the lock collar 6 is eccentrically mounted on the sleeve element 2, rotational motion, as well as longitudinal movement of the sleeve element 2 in the wall 14, is prevented. As further illustrated in FIGS. 1 and 2, an o-ring 7, fitted in each end of the sleeve bore 4, engages the corresponding wall shoulder 3a. The wall penetration sleeve 1 includes a tapered, cylindrical first pressure nut 9 and a similar second pressure nut 10, each characterized by a central pressure nut bore 12 and including multiple, exterior pressure nut threads 11. The first pressure nut 9 and second pressure nut 10 are threaded in the respective sleeve bores 4 of the sleeve element 2, each firmly engaging the corresponding o-ring 7 as the pressure nut threads 11 engage the sleeve threads 5, respectively. As illustrated in FIGS. 2-4, the first pressure nut 9 and second pressure nut 10 receive a utility pipe 16 having a pipe bore 18 and the utility pipe 16 traverses the central bore 4a of the sleeve bore 4.

In typical application, a water or gas such as pressurized water, natural gas or other fluid is distributed from a source (not illustrated) through the utility pipe 16 and wall penetration sleeve 1, to the fluid destination without fear of fluid leakage into the wall 14. Alternatively, electrical or telephone wiring (not illustrated) may be distributed through the utility pipe 16 and the wall penetration sleeve 1, to the destination of the wiring. Still further in the alternative, a pair of utility pipes 16 can be extended through the respective pressure nut bores 12 off the first pressure nut 9 and second pressure nut 10 and butted together in the central bore 4a of the wall penetration sleeve 1 and the first pressure nut 9 and second pressure nut 10 tightened to seal the pipes 16 in the wall 14.

Figure 5:
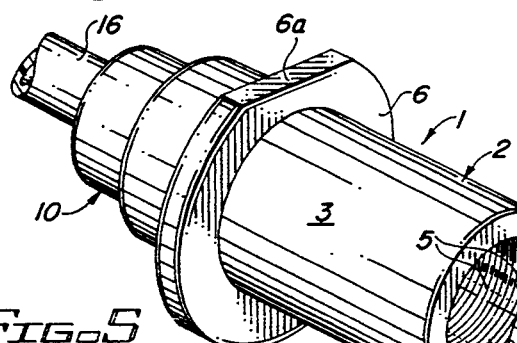
FIG. 5 is an exploded, perspective view of an alternative preferred embodiment of the wall penetration sleeve of this invention.
Figure 6:
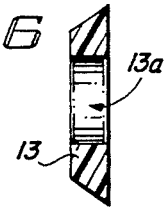
FIG. 6 is a sectional view of a gasket element of the wall penetration sleeve, taken along section line 6—6 in FIG. 5.
Figure 7:
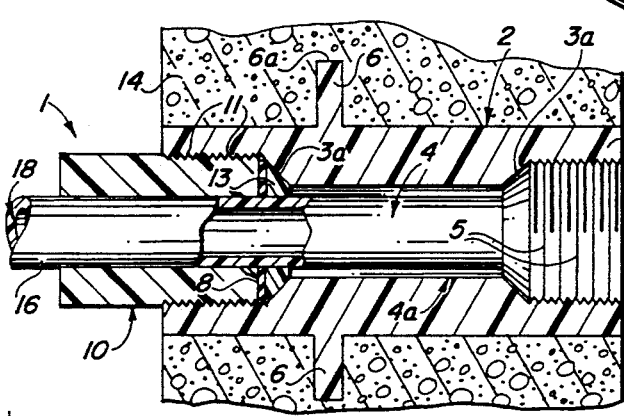
FIG. 7 is an exploded, longitudinal sectional view of the wall penetration sleeve illustrated in FIG. 5, mounted traversely in a concrete, brick or other similarly-constructed wall.

Referring now to FIGS. 5-7 of the drawing, in another preferred embodiment of the invention, the O-ring 7 (illustrated in FIG. 2) is replaced by an annular, tapered gasket 13, typically constructed of rubber or plastic and including a central gasket opening 13a. Each gasket 13, mounted in a corresponding end of the sleeve bore 4, engages the correspondingly-shaped wall shoulder 3a, as illustrated in FIG. 7. A washer 8, also fitted in a corresponding end of the sleeve bore 4, engages the corresponding gasket 13. Accordingly, the first pressure nut 9 and second pressure nut 10 are threaded in the respective ends of the sleeve bore 4, with the ends of the first pressure nut 9 and second pressure nut 10 tightly engaging the corresponding washer 8, as illustrated in FIG. 7. The first pressure nut 9 and second pressure nut 10 thus receive a utility pipe 16 (as illustrated in FIG. 2), and as described above. Each gasket opening 13a thus receives the utility pipe 16, forming a moisture-tight seal between the sleeve bore 4 and the utility pipe 16. As illustrated in FIG. 5, a lock collar 6, mounted circumferentially on the exterior surface of the sleeve element 2, includes a flat, truncated surface 6a shaped in the peripheral edge of the lock collar 6 for preventing longitudinal movement and rotation of the wall penetration sleeve 1 in the wall 14. As described above with respect to the embodiment of the invention illustrated in FIG. 2, the sleeve element 2 can also be used to effectively distribute pressurized water, natural or other gas, electrical wiring and the like through the utility pipe 16 or through a butted pair of utility pipes 16, as desired.

It will be appreciated by those skilled in the art that the durable construction of the wall penetration sleeve 1 prevents concrete, brick or other wall material, which may sag or deteriorate over time, from eventually crushing and breaking the utility pipe 16. This is a problem frequently encountered when pipes are conventionally extended through walls. Additionally, the removable feature of the first pressure nut 9 and second pressure nut 10 facilitates easy replacement of worn-out or corroded o-rings 7 or gaskets 13, as well as corroded or damaged utility pipe 16, as required.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A wall penetration sleeve for securing at least one utility pipe in a wall, comprising an elongated, substantially cylindrical sleeve extending through the wall and having an internally-threaded first end and an internally-threaded second end; a lock collar circumferentially and eccentrically mounted on said sleeve for securing said sleeve in the wall; a first o-ring fitted in said first end and a first externally-threaded pressure nut threaded in said first end for engaging said first o-ring; and a second o-ring fitted in said second end and a second externally-threaded pressure nut threaded in said second end for engaging said second o-ring, whereby said first o-ring and said second o-ring exert sealing pressure on the utility pipe responsive to engagement by said first pressure nut and said second pressure nut, respectively.

2. The wall penetration sleeve of claim 1 comprising a truncated edge provided in said lock collar.

3. A wall penetration sleeve for securing at least one utility pipe in a wall, comprising an elongated, substantially cylindrical sleeve extending through the wall and having an internally-threaded first end and an internally-threaded second end; a lock collar circumferentially mounted on said sleeve and a truncated edge provided on said lock collar for securing said sleeve in the wall; a first gasket fitted in said first end, a first washer fitted in said first end for engaging said first gasket and a first externally-threaded pressure nut threaded in said first end for engaging said first washer; and a second gasket fitted in said second end, a second washer fitted in said second end for engaging said second gasket and a second externally-threaded pressure nut threaded in said second end for engaging said second washer, whereby said first gasket and said second gasket exert sealing pressure on the utility pipe responsive to engagement by said first pressure nut and said second pressure nut, respectively.

* * * * *